(12) United States Patent
Brennan et al.

(10) Patent No.: US 11,055,124 B1
(45) Date of Patent: Jul. 6, 2021

(54) CENTRALIZED STORAGE PROVISIONING AND MANAGEMENT ACROSS MULTIPLE SERVICE PROVIDERS

(71) Applicants: Edward Brennan, Scituate, MA (US); Aaron T. Smith, Sudbury, MA (US); Keith Meyer, Southborough, MA (US); Adnan Sahin, Needham, MA (US); Mark Nadler, Westborough, MA (US); John O. Williams, II, Florence, KY (US); Jesse D. Keefe, Florence, KY (US)

(72) Inventors: Edward Brennan, Scituate, MA (US); Aaron T. Smith, Sudbury, MA (US); Keith Meyer, Southborough, MA (US); Adnan Sahin, Needham, MA (US); Mark Nadler, Westborough, MA (US); John O. Williams, II, Florence, KY (US); Jesse D. Keefe, Florence, KY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 54 days.

(21) Appl. No.: 13/632,095

(22) Filed: Sep. 30, 2012

(51) Int. Cl.
*G06F 9/455* (2018.01)
*G06F 3/06* (2006.01)
*H04L 29/08* (2006.01)

(52) U.S. Cl.
CPC ........ *G06F 9/45558* (2013.01); *G06F 3/0607* (2013.01); *G06F 3/0631* (2013.01); *G06F 3/0635* (2013.01); *G06F 3/0667* (2013.01); *G06F 2009/4557* (2013.01); *H04L 29/08549* (2013.01); *H04L 67/1097* (2013.01)

(58) Field of Classification Search
CPC ....................................................... G06F 17/30
See application file for complete search history.

(56) References Cited

U.S. PATENT DOCUMENTS

7,818,517 B1 * 10/2010 Glade et al. .................. 711/154
7,930,476 B1    4/2011 Castelli et al.
(Continued)

*Primary Examiner* — Matthew J Ellis
(74) *Attorney, Agent, or Firm* — Ryan, Mason & Lewis, LLP (57) ABSTRACT

An information processing system comprises one or more processing platforms and implements a centralized storage provisioning and management system and a plurality of service provider storage systems coupled to the centralized storage provisioning and management system. The centralized storage provisioning and management system is configured to control provisioning and management of the service provider storage systems utilizing information collected from the service provider storage systems. The service provider storage systems may comprise respective service provider data centers, and the centralized storage provisioning and management system may comprise an additional data center separate from the service provider data centers. The centralized storage provisioning and management system may comprise a centralized control path implemented apart from the service provider storage systems. The centralized control path is configured to interact with a plurality of localized control paths implemented in respective ones of the service provider storage systems.

21 Claims, 7 Drawing Sheets

(56) References Cited

U.S. PATENT DOCUMENTS

| | | | |
|---|---|---|---|
| 8,099,487 B1* | 1/2012 | Smirnov | G06F 9/5088 709/223 |
| 8,352,608 B1* | 1/2013 | Keagy | G06F 8/63 709/220 |
| 2004/0103202 A1* | 5/2004 | Hildebrand | G06F 21/6209 709/229 |
| 2005/0154769 A1* | 7/2005 | Eckart et al. | 707/201 |
| 2007/0156670 A1* | 7/2007 | Lim | 707/4 |
| 2007/0214338 A1 | 9/2007 | Mizuno et al. | |
| 2009/0210427 A1* | 8/2009 | Eidler et al. | 707/10 |
| 2010/0274963 A1* | 10/2010 | Innan | G06F 3/0605 711/113 |
| 2011/0066786 A1* | 3/2011 | Colbert | G06F 9/45558 711/6 |
| 2011/0125894 A1* | 5/2011 | Anderson | H04L 9/3213 709/224 |
| 2011/0185121 A1* | 7/2011 | Rajasingam | G06F 11/2064 711/114 |
| 2012/0240110 A1* | 9/2012 | Breitgand et al. | 718/1 |
| 2012/0254269 A1* | 10/2012 | Carmichael | 707/827 |

\* cited by examiner

- AUTOMATION ENGINE
- COLLECTOR
- SOLUTIONS ENABLER
- CONNECT EMC

CENTRALIZED STORAGE PROVISIONING AND MANAGEMENT ACROSS MULTIPLE SERVICE PROVIDERS

FIELD

The field relates generally to information processing systems, and more particularly to storage provisioning and management.

BACKGROUND

In information technology (IT) infrastructure, storage systems may be deployed by respective service providers, each providing storage services to multiple tenants. The IT infrastructure used to implement such storage systems may comprise multiple storage arrays and associated processing platforms, including processing platforms comprising distributed virtual infrastructure or other types of cloud infrastructure. Relative to a given company, organization or other enterprise, such service provider storage systems may be internal or external. An example of an internal service provider storage system may comprise an IT group of an enterprise that acts as a service provider to enterprise users. External service providers may comprise entities that are otherwise unrelated to the enterprise but nonetheless provide storage services to the enterprise users.

Arrangements of this type can be problematic in that there is typically little or no global control provided across the IT infrastructure resources used to implement the multiple storage systems of the various service providers. Instead, it is common for each service provider storage system to be separately provisioned and managed locally, without regard to the storage systems of other service providers sharing the IT infrastructure. Moreover, such localized provisioning and management is often insufficiently automated, and therefore relies heavily on labor-intensive manual oversight by administrative personnel.

It is therefore apparent that a need exists for improved techniques for provisioning and management of storage systems in IT infrastructure.

SUMMARY

Embodiments of the present invention provide improved techniques for storage provisioning and management in cloud infrastructure and other types of IT infrastructure. These embodiments can provide centralized and fully automated control of service provider storage systems in a manner that takes into account a global view of infrastructure resources, thereby ensuring better allocation of infrastructure resources across multiple storage arrays of respective service provider storage systems, as well as enhanced operation of such service provider storage systems.

In one embodiment, an information processing system comprises one or more processing platforms and implements a centralized storage provisioning and management system and a plurality of service provider storage systems coupled to the centralized storage provisioning and management system. The centralized storage provisioning and management system is configured to control provisioning and management of the service provider storage systems utilizing information collected from the service provider storage systems.

The service provider storage systems may comprise respective service provider data centers, and the centralized storage provisioning and management system may comprise an additional data center separate from the service provider data centers. The functionality of the centralized storage provisioning and management system may be provided to the service provider storage systems on a software-as-a-service basis.

The centralized storage provisioning and management system may comprise a centralized control path implemented apart from the service provider storage systems, with the centralized control path being configured to interact with a plurality of localized control paths implemented in respective ones of the service provider storage systems. In such an arrangement, the centralized control path may operate in conjunction with a centralized database storing one or more of configuration information, resource usage information, provider-to-resource mapping information, and performance information regarding each of the service provider storage systems, and a coordinator configured to direct provisioning and management operations of the service provider storage systems utilizing information stored in the centralized database. Also, a given one of the localized control paths may comprise a collector component configured to collect one or more of configuration information, resource usage information and performance information regarding its corresponding service provider storage system.

One or more of the illustrative embodiments described herein exhibit improved performance relative to conventional arrangements in the provisioning and management of storage systems. For example, the disclosed arrangements can be used to ensure that service provider storage systems are deployed in an optimal manner with storage provisioning and management being provided using a software-as-a-service model. Such arrangements can also provide additional benefits to service providers by facilitating the more widespread adoption of services by their tenants.

BRIEF DESCRIPTION OF THE DRAWINGS

FIG. 5 shows a portion of an information processing system in another illustrative embodiment of the invention.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
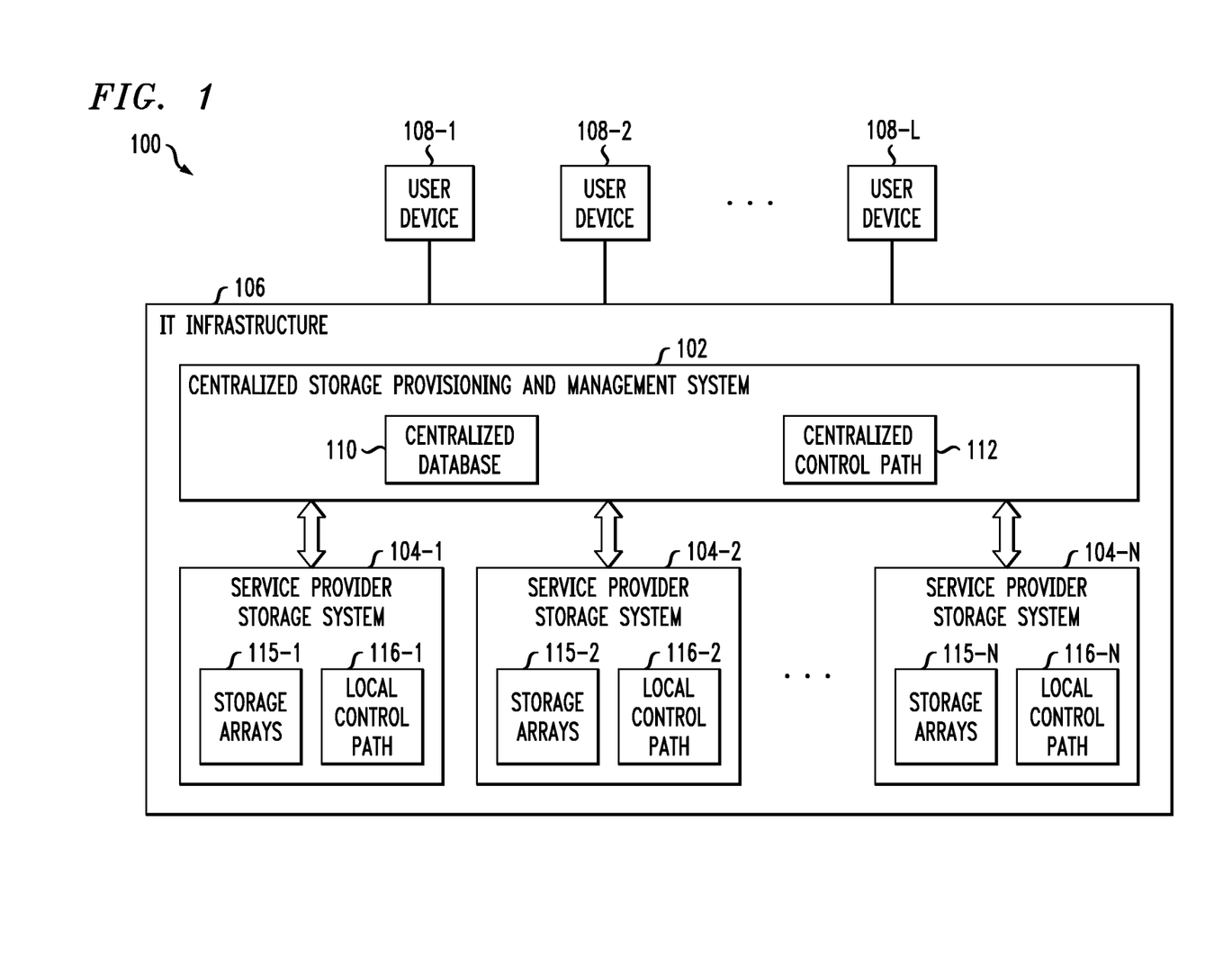
FIG. 1 is a block diagram of information processing system in an illustrative embodiment of the invention.

FIG. 1 shows an information processing system 100 configured in accordance with an illustrative embodiment of the present invention. The information processing system 100 comprises a centralized storage provisioning and management system 102 coupled to a plurality of service provider storage systems 104-1, 104-2, . . . 104-N. The centralized storage provisioning and management system 102 is configured to control provisioning and management of the service provider storage systems 104 utilizing information collected from the service provider storage systems. By way of example, the service provider storage systems 104 may comprise respective service provider data centers, while the centralized storage provisioning and management system 102 may comprise an additional data center separate from the service provider data centers 104. The functionality of the centralized storage provisioning and management system 102 may be provided to the service provider storage systems 104 on a software-as-a-service basis.

The service provider storage systems 104 are implemented with the centralized storage provisioning and management system 102 in a common set of IT infrastructure 106 comprising one or more processing platforms. The IT infrastructure 106 or portions thereof may be implemented using one or more processing devices of a processing platform. Examples of processing platforms that may form portions of the IT infrastructure 106 in system 100 will be described in more detail below in conjunction with FIGS. 3 and 4.

User devices 108-1, 108-2, . . . 108-L utilize storage services provided by the various service provider storage systems 104 implemented in the IT infrastructure 106. The user devices 108 may be configured to allow their corresponding users to access the IT infrastructure 106 via connections established over a network. Such a network, although not expressly illustrated in FIG. 1, may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

A given one of the user devices 108 in the system 100 may be associated with a single user, or multiple users may be associated with a single device. The term "user" as utilized herein is intended to be broadly construed so as to encompass, for example, a human user associated with a given device or set of devices, an automated user such as an application or other hardware or software component associated with a given device, or any other entity that may control that device.

The centralized storage provisioning and management system 102 comprises a centralized database 110 and a centralized control path 112 implemented apart from the service provider storage systems 104. The centralized control path 112 operates in conjunction with the centralized database 110 using information stored in that database and characterizing various aspects of the service provider storage systems 104. For example, the centralized database 110 in the present embodiment stores configuration information, resource usage information, provider-to-resource mapping information, and performance information regarding each of the service provider storage systems 104.

In the present embodiment, the service provider storage systems 104-1, 104-2, . . . 104-N comprise respective storage arrays 115-1, 115-2, . . . 115-N associated with respective localized control paths 116-1, 116-2, . . . 116-N.

By way of example, the storage arrays 115 may comprise storage products such as VNX and Symmetrix VMAX, both commercially available from EMC Corporation of Hopkinton, Mass. A variety of other storage products may be utilized to implement portions of the IT infrastructure 106.

The localized control paths 116 are also referred to herein as local control paths. The centralized control path 112 is configured to interact with the localized control paths 116 implemented in respective ones of the service provider storage systems 104. The centralized control path 112 manages the localized control paths 116 which in turn interface with the respective storage arrays 115. More detailed examples of the centralized control path 112 and localized control paths 116 will be described below in conjunction with FIGS. 6, 7 and 8.

The user devices 108 and portions of the centralized storage provisioning and management system 102 and service provider storage systems 104 may be implemented using a variety of different arrangements of what are generally referred to herein as "processing devices." A given such processing device generally comprises at least one processor and an associated memory, and implements one or more functional modules for controlling certain features of the system 100.

The processor in a given processing device of system 100 may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks. The network interface circuitry may comprise one or more conventional transceivers.

The centralized database 110, centralized control path 112 and localized control paths 116 may be implemented at least in part in the form of software that is stored and executed by respective memory and processor elements of one or more processing devices. Accordingly, as indicated previously, system elements such as elements 102, 104, 106 and 108 may therefore be implemented using one or more processing platforms each comprising multiple processing devices. Such processing platforms may comprise cloud infrastructure of a cloud service provider.

The system 100 in the present embodiment implements one or more processes to provide centralized storage provisioning and management for the service provider storage systems 104 of the IT infrastructure 102. An example of such a process will be described below in conjunction with FIG. 2, but it is to be appreciated that numerous other types of processes may be used in other embodiments.

It is to be appreciated that the particular set of elements shown in FIG. 1 for providing centralized storage provisioning and management for multiple service provider storage systems 104 in IT infrastructure 106 is presented by way of example, and in other embodiments additional or alternative elements may be used.

The operation of the system 100 will now be described in greater detail with reference to the flow diagram of FIG. 2, which illustrates a set of operations performed by the IT infrastructure 106 in an illustrative embodiment. The process as shown includes steps 200 through 204.

In step 200, a centralized storage provisioning and management system is configured for interaction with multiple service provider storage systems. As noted above, this will generally involve configuring a centralized control path 112 to interact with localized control paths 116 of the service provider storage systems 104. The localized control paths 116 may comprise software components that are provided to the service provider storage systems 104 by the centralized storage provisioning and management system 102.

In step 202, the centralized storage provisioning and management system 102 collects information from each of the service provider storage systems 104. Such collected information relates generally to the configuration and utilization of the associated storage arrays 115. The collected information is stored in the centralized database 110, and as indicated previously may comprise, for example, configuration information, resource usage information, provider-to-resource mapping information, performance information, and other types of information regarding each of the service provider storage systems 104. The information may be collected at one or more different levels of resolution, for example, at least portions of the information may be gathered for particular storage blocks within a given storage array 115.

The information may be collected periodically via the centralized control path 112 through interaction with the localized control paths 116 of the service provider storage systems 104. Accordingly, each of the localized control paths 116 may implement a collector component configured to collect configuration information, resource usage information, performance information and other types of information regarding its corresponding service provider storage system 104. This may involve discovering the particular current configuration of the storage environment, including devices, ports, zones, switches, servers, etc. A given such collector component can report the collected information back to the centralized control path 112 at specified time intervals.

In step 204, provisioning and management of the service provider storage systems are controlled by the centralized storage provisioning and management system utilizing the collected information. This step may involve, for example, implementing policy-based provisioning and management for the service provider storage systems 104 utilizing information stored in the centralized database 110. Any of a wide variety of different policies may be used to support policy-based provisioning and management via the centralized storage provisioning and management system 102.

One or more such policies may enforce tenant requirements. For example, if a given tenant does not want its storage provisioned in a specific geographic location (e.g., a designated country), a policy can enforce provisioning to avoid such locations. As another example, if two tenants A and B are not to have their respective storage provisioned in the same set of storage resources (e.g., storage arrays) a policy can enforce placement in separate sets of storage resources for those particular tenants. Of course, these are only examples, and numerous other types of policies can be implemented.

The centralized control path 112 will generally direct at least a portion of this part of the process. For example, the centralized control path 112 may be configured to mine the information stored in the centralized database 110 in order to determine one or more analytics that are utilized in controlling the provisioning and management of the service provider storage systems 104. Such analytics may include performance analytics such as input-output operations per second (IOPS) and numerous others. In some embodiments, information may be stored in the centralized database 110 at least in part in the form of anonymized data, in order to protect certain proprietary features of the operation of the individual service provider storage systems 104.

The localized control paths 116 may each comprise one or more software components configured to execute provisioning and management operations in the corresponding service provider storage system 104 as directed by the centralized control path 112. Such operations may include, for example, configuring storage arrays, configuring switches and configuring storage area networks. As a more particular example, storage area zoning may be adjusted or otherwise configured by direction of the centralized control path 112.

In some embodiments, the service provider storage systems 104 may be configured to provide no local provisioning and management functionality for their associated storage arrays 115, other than that provided under direct control of the centralized storage provisioning and management system 102. This allows the service provider storage systems 104 to essentially offload all of their storage provisioning and management functionality to the centralized storage provisioning and management system 102. In such arrangements, all provisioning and management requests relating to the service provider storage systems 104 are passed through the centralized storage provisioning and management system 102.

In order to facilitate centralized control of the service provider storage systems 104, the centralized storage provisioning and management system 102 may be configured to associate user identifiers with respective tenants of each of the service provider storage systems 104 and to control user access to those storage systems in a manner that allows the centralized storage provisioning and management system 102 to more accurately track resource usage by the service provider storage systems 104. Such an arrangement facilitates the implementation of chargebacks and trending. In addition, the centralized storage provisioning and management system 102 can be configured to require users to login with appropriate credentials and access privileges.

Figure 2:
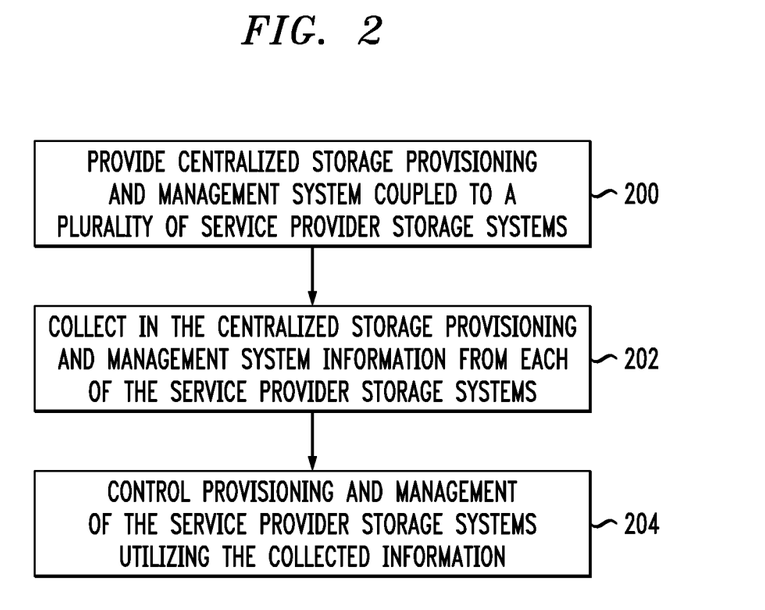
FIG. 2 is a flow diagram of a process for multi-provider storage provisioning and management in the system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing centralized storage provisioning and management for multiple service provider storage systems.

For example, the ordering of the process steps may be varied in other embodiments, or certain steps may be performed concurrently with one another rather than serially. Also, one or more of the process steps may be repeated periodically or on an as-needed basis responsive to particular events. As mentioned above, the steps of the FIG. 2 process are assumed to be implemented in a processing platform comprising at least one processing device having a processor coupled to a memory.

It is to be appreciated that centralized storage provisioning and management functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, a given such embodiment can be configured to ensure that the service provider storage systems 104 are deployed in an optimal manner across the resources of the IT infrastructure 106. The storage provisioning and management is fully automated and policy driven, resulting in a significantly improved allocation of system resources. Moreover, these arrangements allow storage provisioning and management to be provided to the service provider storage systems using a software-as-a-service model.

Figure 3:
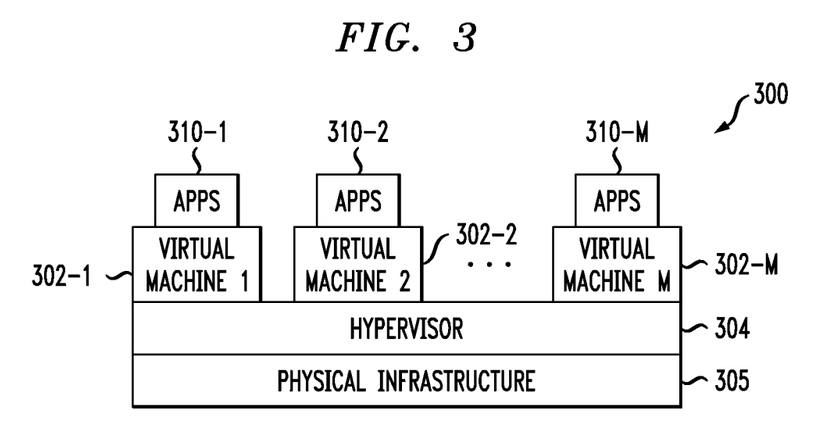
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure 300 of information processing system 100 in one or more embodiments of the invention is the VMware® vSphere™ which may have an associated virtual infrastructure management system such as the VMware® vCenter™.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
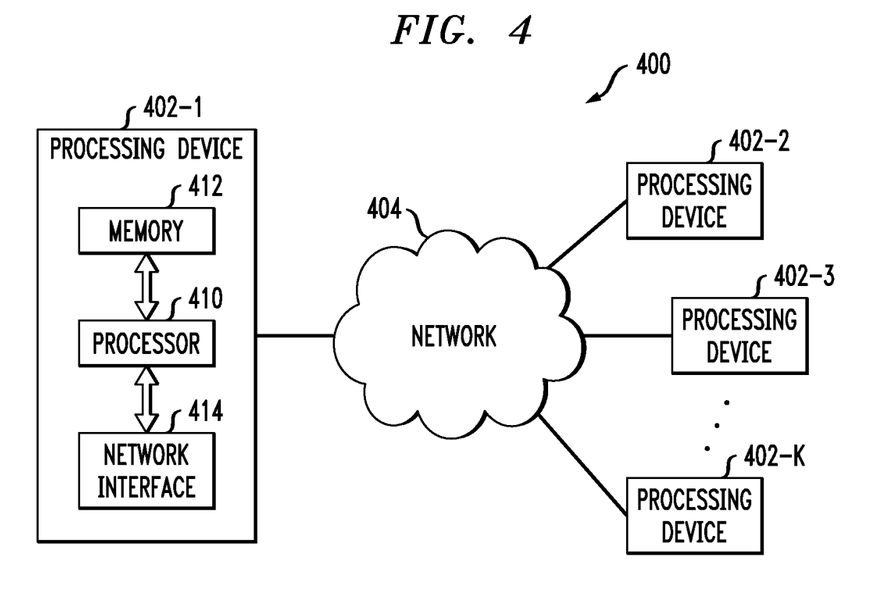

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 3 or 4, or each such element may be implemented on a separate processing platform.

Referring now to FIGS. 5 through 8, additional illustrative embodiments of the present invention will be described. It is to be appreciated that the particular system elements used in these embodiments are considered examples only, and alternative system elements may be used in other embodiments.

In the FIG. 5 embodiment, an information processing system 500 comprises a centralized storage provisioning and management data center 502 and a service provider (SP) data center 504-1, which may be one of a set of SP data centers in system 500 corresponding to respective service provider storage systems. The other SP data centers of system 500 may be configured in a manner similar to that illustrated for SP data center 504-1 in the figure.

The centralized data center 502 is more particularly denoted as an EMC data center, although any of other type of data center may be used in this embodiment and in other embodiments disclosed herein.

The centralized data center 502 comprises a coordinator running on a processing device 520 that implements one or more policies 521 in performing centralized storage provisioning and management in the system 500. Additional components of the centralized data center 502 in this embodiment include a core component implemented on a processing device 522, a staging database 524, a data warehouse 526, and a portal 528 that provides access to an administrator 529.

The SP data center 504 comprises one or more storage arrays 530 that are illustratively implemented using Symmetrix VMAX storage products and configured to include a Virtual Machine File System (VMFS) 531. Other types of storage products may be used in other embodiments. Also, although VMFS is used in this embodiment, other embodiments may use other types of shared storage space for the hypervisors hosting management automation software.

Also included in the SP data center 504-1 are processing devices 532-1 and 532-2 implementing respective VMware® ESXi hypervisors 534-1 and 534-2. More generally, devices 532-1 and 532-2 may run any hypervisor capable of providing high availability functionality by moving or migrating virtual machines.

The SP data center 504-1 implements a number of software components 536-1 including an automation engine, a collector, a Symmetrix VMAX Solutions Enabler, and a ConnectEMC component. Other software components implemented in SP data center 504-1 include a VMware® vCenter™ 536-2, although other hypervisor management programs may be used in its place.

The Solutions Enabler is specific to Symmetrix VMAX, and provides Command Line Interface (CLI) access to the corresponding storage array. In other embodiments, other types of storage array management interfaces may be used.

The ConnectEMC component provides "dial home" functionality in case of hardware and software failures or other errors, as well as remote servicability. It may be viewed as an example of what is more generally referred to herein as a "remote alerting component."

Figure 6:
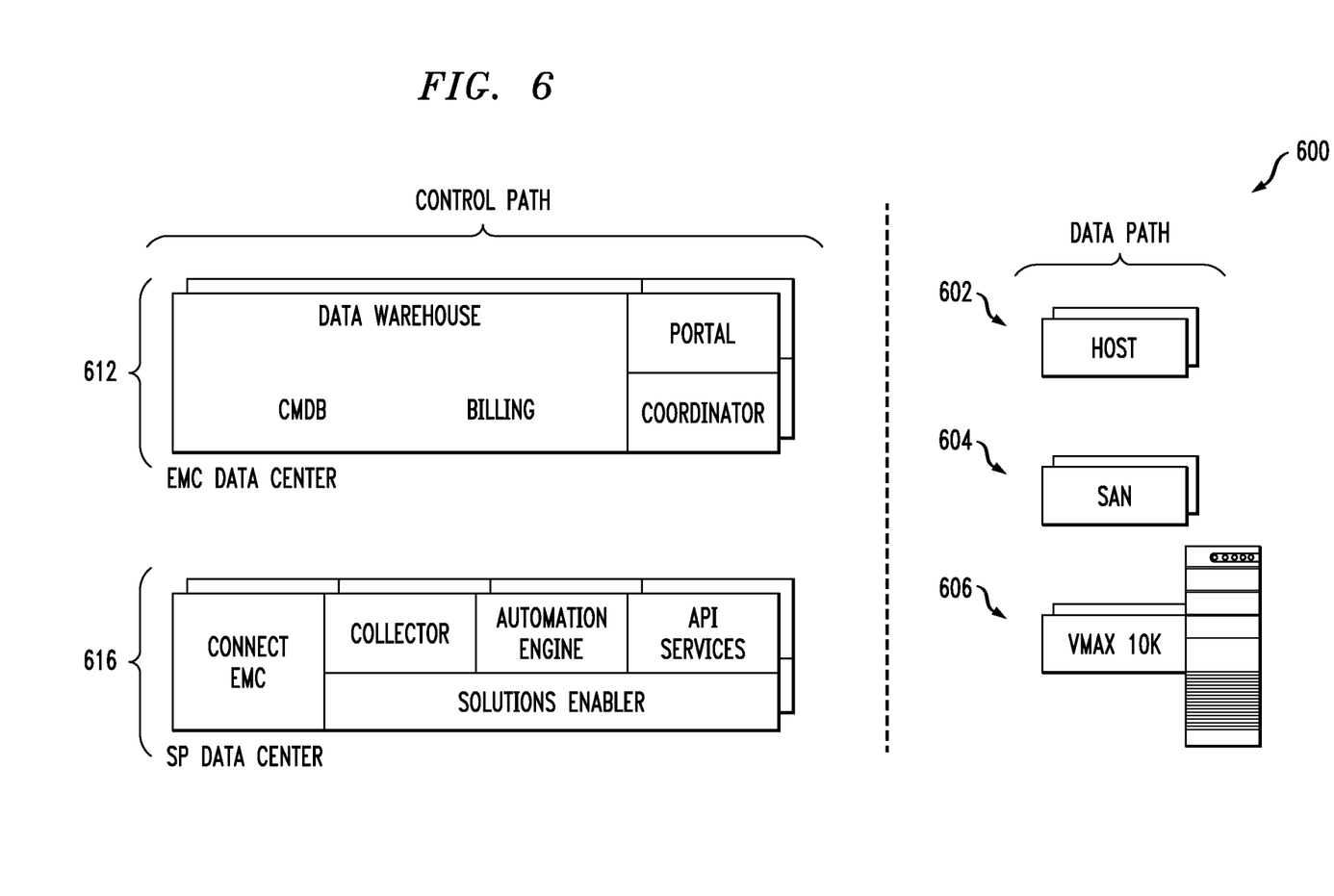
FIGS. 6 and 7 illustrate scaling of the FIG. 5 system within a given service provider data center.

As illustrated in FIG. 6, a portion 600 of the FIG. 5 system comprises a control path and a data path. The data path comprises a set of hosts 602, a set of storage area networks (SANs) 604, and a set of Symmetrix VMAX devices 606.

The control path comprises a centralized control path 612 implemented in the EMC data center 502 and a localized control path 616 implemented in the SP data center 504-1. The centralized control path 612 in this embodiment is shown as comprising certain components of the EMC data center 502 as illustrated in FIG. 5, including coordinator 520, data warehouse 526 and portal 528, and also includes a billing component and a configuration management database (CMDB). The localized control path 616 in this embodiment is shown as comprising certain components of the SP data center 504-1 as illustrated in FIG. 5, including the automation engine, the collector, the Solutions Enabler and the ConnectEMC component, and also includes an application programming interface (API) services component. It is to be appreciated that other arrangements of components may be used to implement the respective centralized and localized control paths 612 and 616 in other embodiments.

The FIG. 5 system comprising the control path and data path arrangements illustrated in FIG. 6 can be readily scaled responsive to changing needs of the associated SP data centers. For example, as illustrated in FIG. 7, a scaled portion 700 of the FIG. 5 system is easily expanded to incorporate multiple sets of Symmetrix VMAX devices as indicated at 702.

Figure 8:
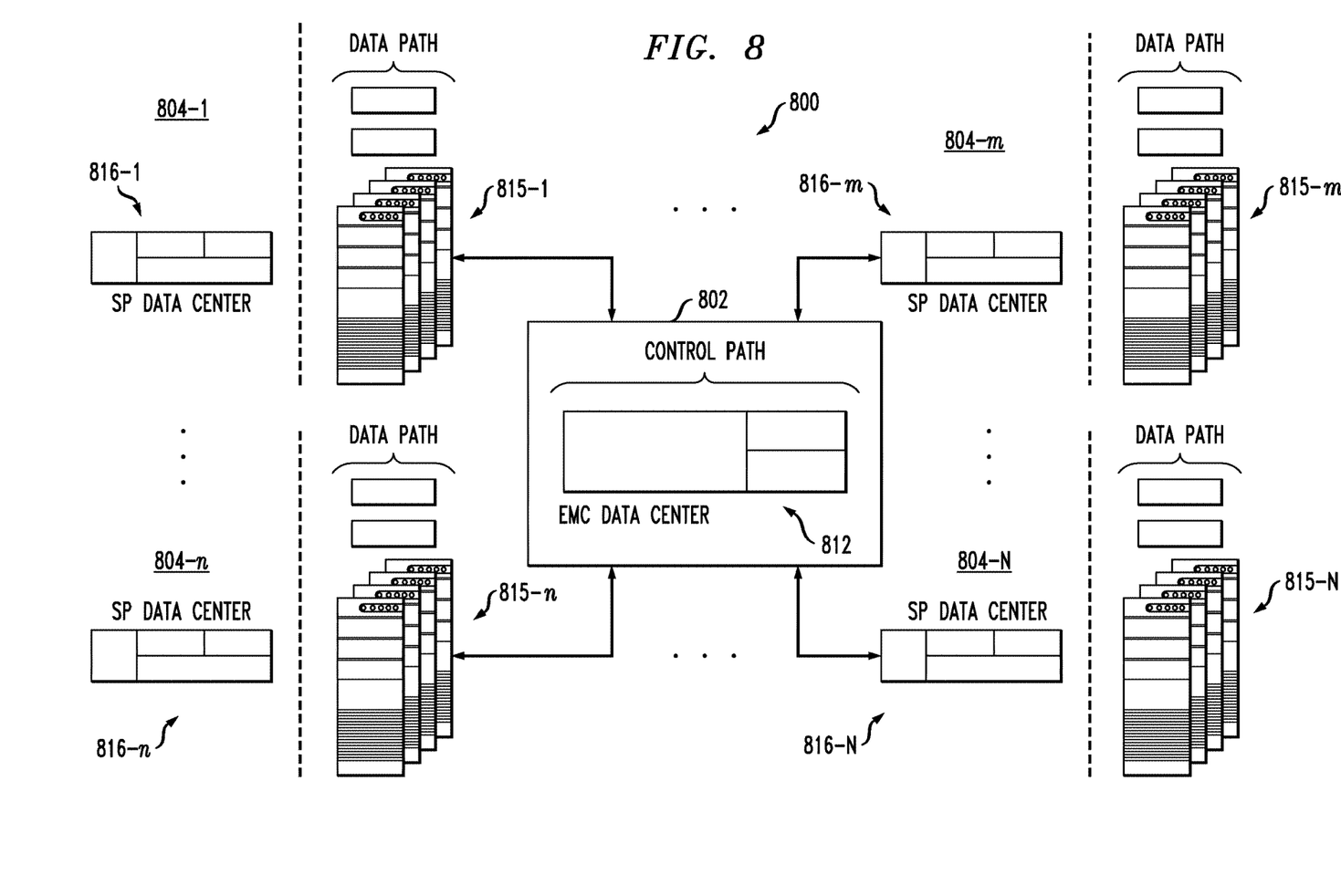
FIG. 8 illustrates scaling of the FIG. 5 system across multiple service provider data centers.

FIG. 8 illustrates a system 800 that results from further scaling of the FIG. 5 system across multiple SP data centers. In this embodiment, system 800 comprises a single EMC data center 802 and N SP data centers 804-1, . . . 804-m, . . . 804-n, . . . 804-N.

Figure 7:
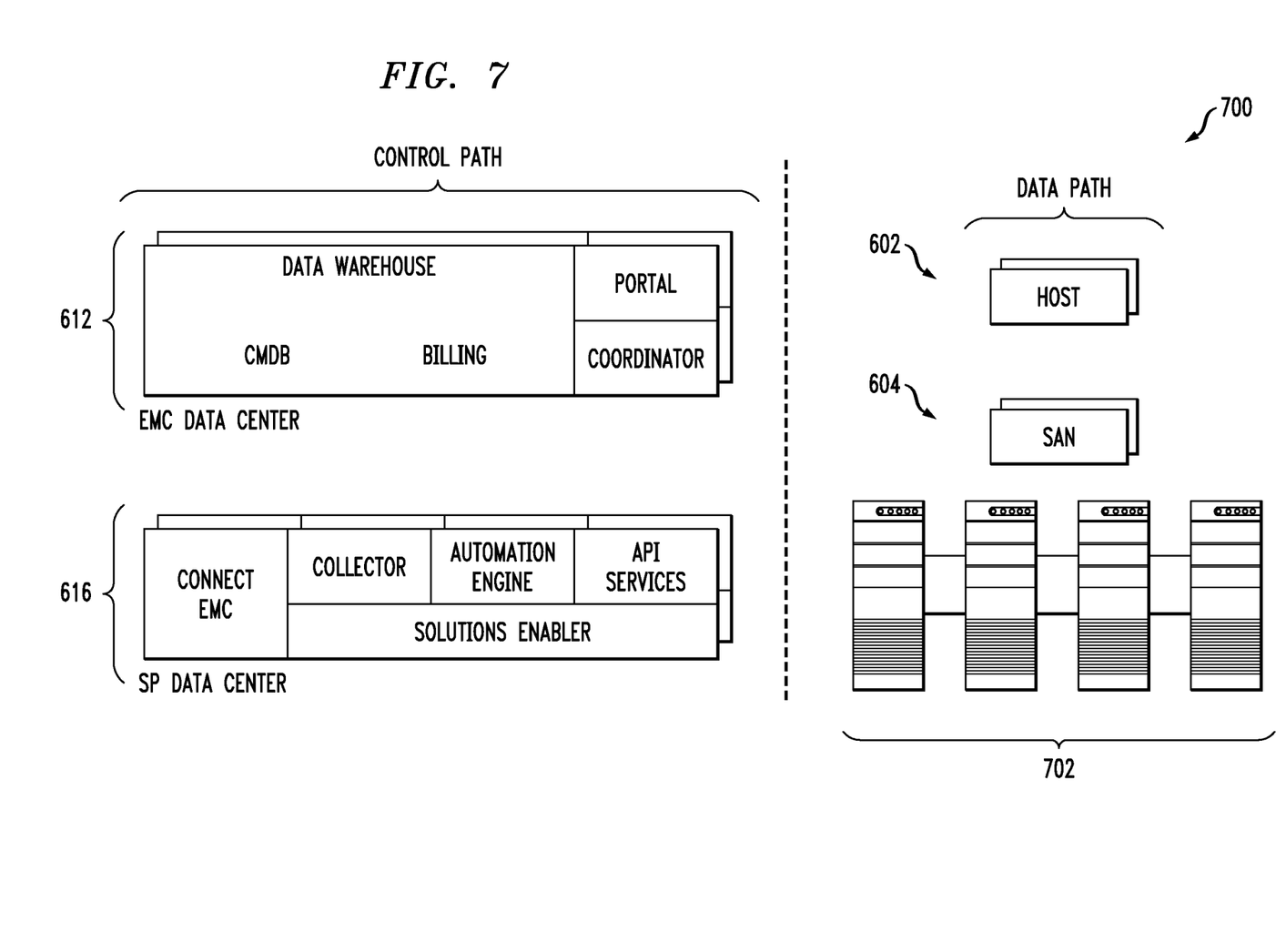

The EMC data center 802 comprises a centralized control path 812 configured in substantially the same manner as the centralized control path 612 of FIGS. 6 and 7.

The SP data centers 804-1, . . . 804-m, . . . 804-n, . . . 804-N include respective sets of Symmetrix VMAX devices 815-1, . . . 815-m, . . . 815-n, . . . 815-N, each similar to sets 702 in FIG. 7, and have respective localized control paths 816-1, . . . 816-n, . . . 816-n, . . . 816-N with each such localized control path being configured in substantially the same manner as the localized control path 616 of FIGS. 6 and 7.

The embodiments of FIGS. 6 through 8 illustrate the ready scalability of the centralized storage provisioning and management functionality disclosed herein. These arrangements advantageously eliminate the need to replicate and independently control and administer storage provisioning and management functionality in each SP data center, and thereby make it much easier for the SP data centers to expand their capabilities.

It should again be emphasized that the above-described embodiments of the invention are presented for purposes of illustration only. Many variations and other alternative embodiments may be used. For example, the disclosed techniques are applicable to a wide variety of other types of information processing systems, processing platform and processing device configurations, centralized databases, centralized and localized control paths, and service provider storage systems. Accordingly, the particular configuration of system and device elements shown in FIGS. 1 and 3-8, and the process shown in FIG. 2, can be varied in other embodiments. Moreover, any assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
  information technology infrastructure comprising a centralized storage provisioning and management system and two or more service provider storage systems;
  the information technology infrastructure comprising a data path and a control path;
  the data path comprising a set of switches, a set of storage area networks, and a set of storage arrays of the information technology infrastructure, each of the two or more service provider storage systems implementing a respective subset of the set of storage arrays;
  the control path comprising a centralized control path implemented in the centralized storage provisioning and management system and two or more localized control paths implemented in the two or more service provider storage systems;
  the centralized control path comprising:
    a configuration management database storing configuration information, resource usage information, service provider-to-storage resource mapping information and performance information regarding the two or more service provider storage systems; and
    a coordinator configured to direct provisioning and management operations of the two or more service provider storage systems based at least in part on one or more policies utilizing the configuration information, the resource usage information, the service provider-to-storage resource mapping information and the performance information stored in the configuration management database;
  a given one of the two or more localized control paths associated with a given one of the service provider storage systems comprising:
    an automation engine configured to control relocation of virtual machines associated with a virtual machine file system implemented using a given subset of the set of storage arrays of the given service provider storage system;
    a collector component configured: to collect the configuration information, the resource usage information and the performance information for the given subset of storage arrays; and to provide the collected configuration information, resource usage information and performance information for the given subset of storage arrays to the centralized control path for storage in the configuration management database; and
    one or more management interfaces for accessing the given subset of storage arrays to perform provisioning and management operations on the given subset of storage arrays under the direction of the coordinator of the centralized control path;

wherein the information technology infrastructure comprises at least one processing device comprising a processor coupled to a memory;
wherein the automation engine is configured to control relocation of at least one of the virtual machines associated with the virtual machine file system by utilizing one or more hypervisors of the given subset of the set of storage arrays to move the at least one virtual machine from a first storage array in the given subset to at least a second storage array in the given subset; and
wherein the coordinator of the centralized control path is configured to direct the automation engine to move the at least one virtual machine from the first storage array to the second storage array to enforce one or more tenant requirements for one or more tenants of the two or more service provider storage systems, the one or more tenant requirements being derived by the coordinator from analytics performed on the configuration information, resource usage information, service provider-to-storage resource mapping information and performance information regarding the two or more service provider storage systems in the configuration management database.

2. The apparatus of claim 1 wherein the centralized control path further comprises a portal providing administrator access to the centralized storage provisioning and management system to specify the one or more policies.

3. The apparatus of claim 1 wherein the given localized control path further comprises a remote alerting component configured to provide remote serviceability of the given subset of storage arrays.

4. The apparatus of claim 3 wherein the remote alerting component is configured to generate alerts for delivery to the centralized control path responsive to detection of hardware and software failures in the given subset of storage arrays.

5. The apparatus of claim 1 wherein the data path is scalable to expand to incorporate one or more additional switches, one or more additional storage area networks, and one or more additional storage arrays.

6. The apparatus of claim 1 wherein the centralized control path manages the two or more localized control paths, the two or more localized control paths interfacing with the set of storage arrays over the data path.

7. The apparatus of claim 1 wherein the one or more management interfaces of the given localized control path provide command line interface (CLI) access to the given subset of the storage arrays.

8. The apparatus of claim 1 wherein the two or more localized control paths comprise software components provided to the two or more service provider storage systems by the centralized storage provisioning and management system.

9. The apparatus of claim 8 wherein the software components of the two or more localized control paths are provided to the two or more service provider storage systems using a software-as-a-service model.

10. The apparatus of claim 1 wherein the collector component of the given localized control path is configured to discover a current configuration of a storage environment of the given subset of storage arrays.

11. The apparatus of claim 10 wherein the collector component of the given localized control path is configured to provide information characterizing the current configuration of the storage environment to the centralized control path at one or more specified time intervals.

12. The apparatus of claim 1 wherein the coordinator of the centralized control path is configured:
to mine the configuration information, the resource usage information, the service provider-to-storage resource mapping information and the performance information stored in the configuration management database to determine one or more performance analytics for the set of storage arrays; and
to utilize the one or more performance analytics to direct at least a portion of the provisioning and management operations of the two or more service provider storage systems.

13. The apparatus of claim 12 wherein the provisioning and management operations of the two or more service provider storage systems comprise configuring the set of switches, the set of storage area networks and the set of storage arrays of the data path.

14. The apparatus of claim 1 wherein the two or more service provider storage systems are configured to provide no local provisioning and management functionality for the set of storage arrays other than that provided under direct control of the centralized storage provisioning and management system.

15. The apparatus of claim 14 wherein the two or more service provider storage systems are configured to offload storage provisioning and management functionality to the centralized storage provisioning and management system by passing through provisioning and management requests relating to the service provider storage systems to the centralized control path of the centralized storage provisioning and management system over the two or more localized control paths.

16. A method comprising:
providing in information technology infrastructure a centralized storage provisioning and management system coupled to two or more service provider storage systems;
configuring a data path of the information technology infrastructure to comprise a set of switches, a set of storage area networks, and a set of storage arrays, each of the two or more service provider storage systems implementing a respective subset of the set of storage arrays; and
configuring a control path of the information technology infrastructure, the control path comprising a centralized control path implemented in the centralized storage provisioning and management system and two or more localized control paths implemented in the two or more service provider storage systems;
the centralized control path comprising:
a configuration management database storing configuration information, resource usage information, service provider-to-storage resource mapping information and performance information regarding the two or more service provider storage systems; and
a coordinator configured to direct provisioning and management operations of the two or more service provider storage systems based at least in part on one or more policies utilizing the configuration information, the resource usage information, the service provider-to-storage resource mapping information and the performance information stored in the configuration management database; and
a given one of the two or more localized control paths associated with a given one of the service provider storage systems comprising:
an automation engine configured to control relocation of virtual machines associated with a virtual machine file system implemented using a given subset of the set of storage arrays of the given service provider storage system;

a collector component configured: to collect the configuration information, the resource usage information and the performance information for the given subset of storage arrays; and to provide the collected configuration information, resource usage information and performance information for the given subset of storage arrays to the centralized control path for storage in the configuration management database; and one or more management interfaces for accessing the given subset of storage arrays to perform provisioning and management operations on the given subset of storage arrays under the direction of the coordinator of the centralized control path;

wherein the method is performed by at least one processing device comprising a processor coupled to a memory;

wherein the automation engine is configured to control relocation of at least one of the virtual machines associated with the virtual machine file system by utilizing one or more hypervisors of the given subset of the set of storage arrays to move the at least one virtual machine from a first storage array in the given subset to at least a second storage array in the given subset; and wherein the coordinator of the centralized control path is configured to direct the automation engine to move the at least one virtual machine from the first storage array to the second storage array to enforce one or more tenant requirements for one or more tenants of the two or more service provider storage systems, the one or more tenant requirements being derived by the coordinator from analytics performed on the configuration information, resource usage information, service provider-to-storage resource mapping information and performance information regarding the two or more service provider storage systems in the configuration management database.

17. The method of claim 16 wherein configuring the control path comprises providing the two or more localized control paths as software components to the two or more service provider storage systems using a software-as-a-service model.

18. The method of claim 16 wherein:
the two or more service provider storage systems are configured to provide no local provisioning and management functionality for the set of storage arrays other than that provided under direct control of the centralized storage provisioning and management system; and
the two or more service provider storage systems are configured to offload storage provisioning and management functionality to the centralized storage provisioning and management system by passing through provisioning and management requests relating to the service provider storage systems to the centralized control path of the centralized storage provisioning and management system over the two or more localized control paths.

19. A computer program product comprising a non-transitory processor-readable storage medium having encoded therein executable code of one or more software programs, wherein the one or more software programs when executed in information technology infrastructure cause the information technology infrastructure:

to provide a centralized storage provisioning and management system coupled to two or more service provider storage systems;

to configure a data path of the information technology infrastructure to comprise a set of switches, a set of storage area networks, and a set of storage arrays, each of the two or more service provider storage systems implementing a respective subset of the set of storage arrays; and to configure a control path of the information technology infrastructure, the control path comprising a centralized control path implemented in the centralized storage provisioning and management system and two or more localized control paths implemented in the two or more service provider storage systems;

the centralized control path comprising:
a configuration management database storing configuration information, resource usage information, service provider-to-storage resource mapping information and performance information regarding the two or more service provider storage systems; and a coordinator configured to direct provisioning and management operations of the two or more service provider storage systems based at least in part on one or more policies utilizing the configuration information, the resource usage information, the service provider-to-storage resource mapping information and the performance information stored in the configuration management database; and a given one of the two or more localized control paths associated with a given one of the service provider storage systems comprising:
an automation engine configured to control relocation of virtual machines associated with a virtual machine file system implemented using a given subset of the set of storage arrays of the given service provider storage system;

a collector component configured: to collect the configuration information, the resource usage information and the performance information for the given subset of storage arrays; and to provide the collected configuration information, resource usage information and performance information for the given subset of storage arrays to the centralized control path for storage in the configuration management database; and one or more management interfaces for accessing the given subset of storage arrays to perform provisioning and management operations on the given subset of storage arrays under the direction of the coordinator of the centralized control path;

wherein the automation engine is configured to control relocation of at least one of the virtual machines associated with the virtual machine file system by utilizing one or more hypervisors of the given subset of the set of storage arrays to move the at least one virtual machine from a first storage array in the given subset to at least a second storage array in the given subset; and wherein the coordinator of the centralized control path is configured to direct the automation engine to move the at least one virtual machine from the first storage array to the second storage array to enforce one or more tenant requirements for one or more tenants of the two or more service provider storage systems, the one or more tenant requirements being derived by the coordinator from analytics performed on the configuration information, resource usage information, service provider-to-storage resource mapping information and performance information regarding the two or more service provider storage systems in the configuration management database.

20. The computer program product of claim 19 wherein configuring the control path comprises providing the two or more localized control paths as software components to the two or more service provider storage systems using a software-as-a-service model.

21. The computer program product of claim 19 wherein:
  the two or more service provider storage systems are configured to provide no local provisioning and management functionality for the set of storage arrays other than that provided under direct control of the centralized storage provisioning and management system; and
  the two or more service provider storage systems are configured to offload storage provisioning and management functionality to the centralized storage provisioning and management system by passing through provisioning and management requests relating to the service provider storage systems to the centralized control path of the centralized storage provisioning and management system over the two or more localized control paths.

* * * * *